E. T. LARK.
FASTENER FOR AUTOMOBILE HOODS.
APPLICATION FILED OCT. 19, 1916.

1,222,549. Patented Apr. 10, 1917.

Inventor:
Everard T. Lark,
By Hugh N. Wagner,
Atty.

UNITED STATES PATENT OFFICE.

EVERARD T. LARK, OF NEW HANOVER, ILLINOIS.

FASTENER FOR AUTOMOBILE-HOODS.

1,222,549.

Specification of Letters Patent.

Patented Apr. 10, 1917.

Application filed October 19, 1916. Serial No. 126,509.

*To all whom it may concern:*

Be it known that I, EVERARD T. LARK, a citizen of the United States, residing at New Hanover, in the county of Monroe and State of Illinois, have invented certain new and useful Improvements in Fasteners for Automobile-Hoods, of which the following is a specification.

This invention provides means, positive in action, rapid in use, tight in result, and adjustable (to allow for natural wear and tear), for the fastening of the loose leaves of automobile hoods to the frame or other suitable part of a motor-driven apparatus. It may, also, be used to hold down in place the covers over storage batteries, tool boxes, and the like mounted on the running-board of motor-driven cars or the like. It is adapted, also, for use for various similar useful purposes.

Various catches or fasteners have heretofore been used for holding in place the leaves of automobile hoods, the covers of battery and tool boxes, and the like, but they have all been open to various objections. Some of them have not held the objects securely; some of them have been so loose as to allow a rattling noise; some of them have been of such construction as readily to become separated from the held parts and to get lost on the road; and those that have depended upon screws and nuts have been slow to operate, which slowness in operation has been objectionable not only from the standpoint of time lost and inconvenience, but also in the case of fire about the motor within the automobile hood a source of danger and loss by preventing the rapid raising of one of the leaves of the hood for the purpose of using a fire extinguisher.

Figure 1:
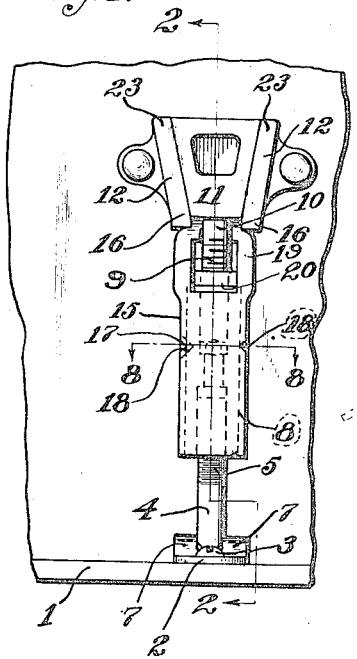
Figure 2:
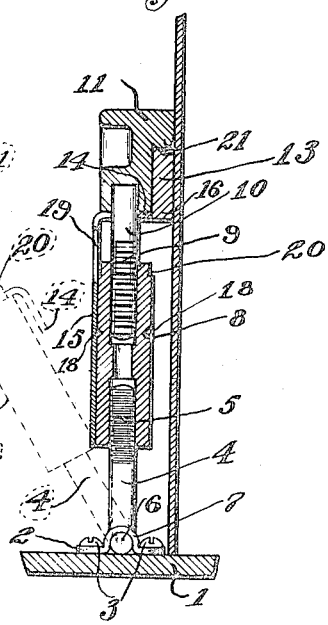
Figure 3:
Figure 4:
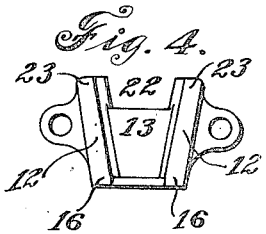
Figure 5:
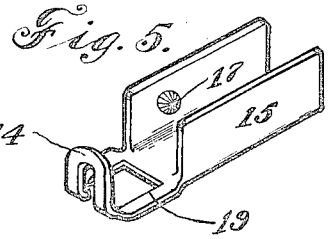
Figure 6:
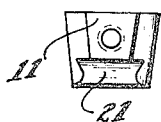
Figure 7:
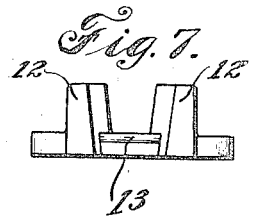
Figure 8:
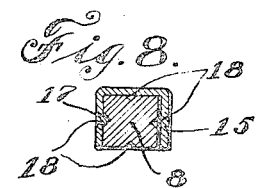

In the drawings forming part of this specification and in which like numbers of reference denote like parts wherever they occur, Figure 1 is a front elevation showing this device attached to a leaf of an automobile hood and also to a fixed support such as a part of the frame of the vehicle;

Fig. 2 is a sectional view thereof on the line 2—2, Fig. 1; and

Figs. 3 to 8 inclusive represent details of the device.

To the support 1 is attached, by any suitable means such as the perforated and bent plate 2 and screws or the like 3, the longitudinal member 4, which has thereon the screw-threaded portion 5. At its other end it is provided with a T-head 6 or other suitable projection that fits underneath the bend 7 of the plate 2. The threaded part 5 fits into an internally-threaded socket in the rotatable member 8, which is provided at its other end with an oppositely internally-threaded socket for the reception of the screw-threaded part 9 of the rod 10. The screw-threading in one of the sockets in member 8 is left-handed and in the other right-handed, and to the direction of screw-threading in their respective sockets in member 8 the screw-threading on the members 4 and 10 at 9 respectively correspond. A head and socket connection is provided, and the head member 11 is fixed upon the outer end of rod 10, and when in locking position is drawn as a wedge between the lugs 12 of the socket member 13. The socket member 13 is attached by any suitable means to the leaf of the automobile hood or battery or tool box cover or other loose part that is to be locked.

The first adjustment is to rotate member 8 on screw-threads 5 until the adjustment is such as to the length of the device from T-head 6 to the head 11 that approximately one-quarter turn of member 8 upon threads 9 will cause the head 11 to be drawn tightly into wedged position between the lugs 12. This adjustment having been made and the said quarter turn having been given to the said member 8, the tip 14 of the keeper 15 is inserted in the space between the inner ends 16 of the lugs 12 and the said keeper is then caused to lie flat upon and engage on the top and two sides the member 8. As the said tip 14 is locked between the shoulders or ends 16 and by reason of its internal angles is locked upon angular member 8, member 8 can not rotate by reason of vibration or be rotated by hand until keeper 15 has been caused to assume the position indicated in dotted lines in Fig. 2, whereupon the locking device, pivoted at 6 and including the head 11, can be moved to the position indicated in dotted lines in Fig. 2, which releases the object fastened, such as hood leaf, cover, or the like, from its fastening. To prevent keeper 15 from sliding, a projection 17 or the like is provided adapted to engage with any of the recesses 18 notched in the member 8. Although the projection 17 can engage only one of these notches at one time, a plurality of the same is provided so as to allow for seating therein when by adjustment after wear of the threads on members 4 and 10 and in their corresponding sockets new adjustment of the device has been rendered necessary.

For the purpose of rotating the member 8, its fork 19 may be hooked around the angular shoulder 20 of the member 8 or, if of suitable size, around the angular member 8 itself or, if desired, the member 8 (partially inclosed within the keeper 15) may be grasped by the fingers and thus turned after drawing keeper 15 longitudinally along member 8 far enough to unlock tip 14 from shoulders 16.

Preferably the wedge formed by the co-acting head and socket members 11 and 13 is double, viz., tapering toward its seat and from the outermost part inwardly toward member 8. The head 11 is at its outermost extremity provided with a lip 21, which seats in the space 22 between the outermost extremities 23 of the member 13.

Having thus described this invention, I hereby reserve the benefit of all changes in form, arrangement, order, or use of parts, as it is evident that many minor changes may be made therein without departing from the spirit of this invention.

I claim:

1. A fastener comprising co-acting head and socket members, a screw member for producing engagement thereof, and means carried by the screw member adapted to engage the socket member to prevent operation of the screw member.

2. A fastener comprising coacting head and socket wedge members, a rotatable member for producing engagement thereof, and means carried by one of the members adapted to engage one of the other members to prevent rotation of one of said members.

3. A fastener comprising head and socket wedge members, a screw member, a rotatable member adapted to act with said screw member to produce engagement of the said wedge member, and means carried by the rotatable member surrounding a portion of the head member and adapted to engage the socket member to prevent rotation of the rotatable member.

4. A head and socket fastener comprising a socket member borne by the member to be fastened, a head member adapted to engage the same, a pivoted member carrying the said head member, screw means to draw the fastening members into engagement, and means operatively associated with the screw means and socket member to prevent operation of the screw means.

5. A fastener comprising a socket member borne by the member to be fastened, a head member adapted to engage the same, a pivoted member carrying the said head member, screw means to draw the fastening members into engagement, a keeper straddling the screw means and having an angular upper end slotted to inclose a portion of the head member and adapted for engagement with the socket member whereby to prevent operation of the screw means.

6. A fastener comprising an element borne by the member to be fastened, a longitudinal movable element adapted to engage therewith, a support, screw means connected with the said support, a rotatable member adapted to co-act with said screw means and to draw the fastening members into engagement with each other, and a U-shaped keeper inclosing said rotatable member and engaging the first-named element to prevent movement of the longitudinal movable element.

7. A fastener comprising an element borne by the member to be fastened, a longitudinal movable element adapted to engage therewith, a support, screw means connected with the said support, a rotatable member rectangular in cross-section adapted to co-act with said screw means and to draw the fastening members into engagement with each other, and a U-shaped keeper inclosing the rotatable member adapted to lock the said members in fastening position, the said keeper having an opening therein corresponding to the cross-sectional contour of the rotatable member adapted to receive the same, whereby the keeper acts as a handle for operating the rotatable member.

8. A fastener comprising an element borne by the member to be fastened, a longitudinal movable element adapted to engage therewith, a support, screw means connected with the said support, a rotatable member adapted to co-act with said screw means and to draw the fastening members into engagement with each other, and a keeper adapted to lock the said members in fastening position, the upper end of said keeper being angularly bent for engagement with the first-named element for keeping the same in fixed relation to the said rotatable element.

9. A fastener comprising co-acting members, one of the said members having a shoulder at one end thereof, means for drawing the said co-acting means into engagement with each other, and a keeper so formed as to be held in fixed relation to the said last-mentioned means and having a right-angular projection thereon adapted to engage the said shoulder, whereby the last-named means is held inoperative.

10. A fastener comprising co-acting members, one of the said members having a shoulder on its lower end, means for drawing the said co-acting means into engagement with each other, and a keeper so formed as to be held in fixed relation to the said last-mentioned means and having a projection thereon adapted to be positioned beneath the shouldered member to engage the said shoulder and having means coöperating with means on the first-named means for preventing vibrational or accidental displacement from engagement with the said shoulder.

11. A fastener comprising head and socket members, a turn-buckle mechanism for locking the members, and means loosely carried by the turn-buckle mechanism adapted to be shifted positively to engage the rotatable member thereof and act as a handle to operate the same.

12. A fastener comprising head and socket members, a turn-buckle mechanism for locking the members, the rotary member of the turn-buckle mechanism being angular in cross-section, and a keeper having an angular opening therein adapted to receive the angular rotary member to operate the turn-buckle mechanism to lock the head and socket members.

In testimony whereof I hereunto affix my signature.

EVERARD T. LARK.